(12) United States Patent
Oxner et al.

(10) Patent No.: US 9,243,520 B2
(45) Date of Patent: Jan. 26, 2016

(54) APPARATUS, SYSTEMS, AND METHODS FOR LOW GRADE WASTE HEAT MANAGEMENT

(71) Applicant: ElectraTherm, Inc., Reno, NV (US)

(72) Inventors: Andrew Oxner, Reno, NV (US); Hans Wain, Truckee, CA (US); August Brautigam, Reno, NV (US)

(73) Assignee: ElectraTherm, Inc., Reno, NV (US)

( * ) Notice: Subject to any disclaimer, the term of this patent is extended or adjusted under 35 U.S.C. 154(b) by 0 days.

(21) Appl. No.: 14/217,001

(22) Filed: Mar. 17, 2014

(65) Prior Publication Data
US 2014/0260250 A1 Sep. 18, 2014

Related U.S. Application Data

(60) Provisional application No. 61/801,559, filed on Mar. 15, 2013.

(51) Int. Cl.
F01K 25/08 (2006.01)
F01B 29/08 (2006.01)
F01B 29/10 (2006.01)
F02G 1/04 (2006.01)
F01K 13/00 (2006.01)
F01K 25/00 (2006.01)

(52) U.S. Cl.
CPC ................................. F01K 25/08 (2013.01)

(58) Field of Classification Search
CPC ........ F01C 1/063; F01C 1/356; F01C 11/004; F01C 21/008; F01K 13/006; F01K 23/065; F01K 25/06; F01K 25/08; F01K 25/10; F02B 1/04; F02G 1/02; F02G 1/04; F02G 1/043; F02G 1/0435; F02G 1/055; F02G 2244/50; F03G 7/06; F05C 2225/08; F25B 9/14; F25B 11/02
USPC ........... 60/516, 520, 618, 651, 662, 671, 676; 290/1 A, 52
See application file for complete search history.

(56) References Cited

U.S. PATENT DOCUMENTS

| | | |
|---|---|---|
| 2008/0072592 A1* | 3/2008 | Driver ............................ 60/520 |
| 2010/0192574 A1 | 8/2010 | Langson |
| 2010/0258251 A1 | 10/2010 | Nitschke |
| 2011/0283702 A1 | 11/2011 | Huber et al. |
| 2012/0047889 A1 | 3/2012 | Acikgoz et al. |

FOREIGN PATENT DOCUMENTS

EP 2360354 A2 8/2011

* cited by examiner

Primary Examiner — Jorge Pereiro
Assistant Examiner — Daniel Wagnitz
(74) Attorney, Agent, or Firm — D. C. Williams

(57) ABSTRACT

The present invention relates to apparatus, systems, and methods of managing large quantities of low-grade waste heat energy by 1) generating excess electric power via an ORC process driven by the removal and recovery of waste heat under favorable operating conditions, and 2) utilizing the same apparatus to provide waste heat removal via a refrigeration process that consumes electric power when environmental conditions do not permit operation in the ORC mode. The mode of operation of the system is principally determined by the thermal energy of the waste heat stream and the availability, or lack thereof, of adequate cooling resources. Such resources are often subject to local environmental conditions, particularly ambient temperature which varies on a diurnal and annual basis.

22 Claims, 6 Drawing Sheets

APPARATUS, SYSTEMS, AND METHODS FOR LOW GRADE WASTE HEAT MANAGEMENT

RELATED APPLICATIONS

This application claims benefit of U.S. Provisional Patent Application No. 61/801,559, entitled "Apparatus, Systems, and Methods for Net-Zero Waste Heat Management" and filed on Mar. 15, 2013. The instant application incorporates said application herein by reference in its entirety. In the event of inconsistency between anything stated in this specification and anything incorporated by reference in this specification, this specification shall govern.

FIELD OF THE INVENTION

The present invention relates to apparatus, systems, and methods of managing large quantities of low-grade waste heat energy by 1) generating excess electric power via an ORC process driven by the removal and recovery of waste heat under favorable operating conditions, and 2) utilizing the same apparatus to provide waste heat removal via a refrigeration process that consumes electric power when environmental conditions do not permit operation in the ORC mode. The mode of operation of the system is principally determined by the thermal energy of the waste heat stream and the availability, or lack thereof, of adequate cooling resources. Such resources are often subject to local environmental conditions, particularly ambient temperature which varies on a diurnal and annual basis.

BACKGROUND OF THE INVENTION

Systems and methods for the removal of generally high-grade (high temperature) and medium-grade (medium temperature) waste heat is well known in the art. In particular, systems which employ the organic Rankine cycle (ORC) are used to convert high- and medium-grade waste heat energy into rotational mechanical energy that in turn can be coupled to an electric generator that may be connected to the commercial grid or used to provide independent power in locations where commercial power service is not available.

In the prior art ORC systems depicted in FIG. 1, heat energy may be directly supplied from the source to port 106 or its dedicated equivalent. The heated matter flows through heat exchanger 101 and exits at port 107 after transferring a portion of its latent heat energy to the separate but thermally coupled closed loop ORC system which typically employs an organic refrigerant as a working fluid. Under pressure from the system pump 105, the heated working fluid, predominantly in a gaseous state, is applied to the input port of expander 102, which may be a machine of various configurations including but not limited to a positive displacement twin screw expander, scroll expander, turbine, or the like. Here, the heated and pressurized working fluid is allowed to expand within the device, and such expansion produces rotational kinetic energy that is operatively coupled to drive electric generator 103 and produce electric power which then may be delivered to a local, isolated power grid or to the commercial power grid. The expanded working fluid at the output port of the expander, which may either be an essentially dry vapor or be a mixture of liquid and gaseous working fluid, is then delivered to condenser subsystem 104 where it is cooled until it has returned to its fully liquid state.

The condenser subsystem sometimes includes an array of air-cooled radiators or another system of equivalent performance through which the working fluid is circulated until it reaches the desired temperature and state, at which point it is applied to the input of system pump 105. System pump 105, typically a centrifugal pump, provides the motive force to pressurize the entire system and supply the liquid working fluid to heat exchanger 101, where it once again is heated by the energy supplied by the waste heat source and experiences a phase change to its gaseous state as the organic Rankine cycle repeats. The presence of working fluid throughout the closed loop system ensures that the process is continuous as long as sufficient heat energy is present at input port 106 to provide the requisite energy to heat the working fluid to the necessary temperature. See, for example, Langson U.S. 7,637,108 ("Power Compounder") which is hereby incorporated by reference.

However, the ability of ORC systems to operate properly are often limited by the cooling resources available to remove residual, unconverted heat from their working fluid media during the Rankine cycle process of heating, expansion, cooling, and repressurization. For proper operation, a sufficient temperature differential (a minimum of 50° F., and preferably from 80° F.-100° F.) must exist between the waste heat input stream and the cooling resources available at the site. With a sufficiently high temperature waste heat input stream and/or consistently available cooling resources of sufficiently low temperature, ORC operation may be reliably achieved.

The practical limits of these conditions are being tested. The problem of low grade waste heat removal is very common in a variety of industries including automotive manufacturing, food processing, oil and natural gas processing, and computer data centers. Applications of this type generate vast quantities of waste heat in the range of 140°-190° F. in support of computer and data storage hardware, for example. At present, powered cooling systems are usually employed to remove this waste heat at significant additional expense to the operator. The trend is to locate these facilities in generally cooler (or cold) climates where the cooling requirements are reduced due to ambient conditions. Nonetheless, the cost of electric power to cool the facilities may still exceed to cost of electric power to operate the equipment being cooled.

In warmer climates, and even during the daytime hours of summer months in cooler climates, an insufficient temperature differential exists to permit power generation via the ORC process. With a higher temperature waste heat input and consistently favorable cooling resources, a conventional ORC waste heat power generation system may present a viable and cost-effective method of removing such heat. However, the generally low-grade heat produced by the applications discussed above would relegate an ORC system to part-time operation during frequent unfavorable cooling conditions and a supplemental cooling system would be required for periods when the ORC system was inoperable. As such, an ORC waste heat recovery system is not sufficient for use with applications that generate low grade waste heat in any but the coldest climates.

For the aforementioned reasons, there is a considerable need for a system capable of providing adequate management of low grade waste heat under the widest possible range of environmental conditions. The ideal system will preferably and advantageously convert as much energy as possible from the waste heat stream and convert it to other form(s) for beneficent use while consuming as little energy as possible for its own operation. Further, this ideal system will utilize as few components as possible to minimize cost, maximize reliability, and occupy as little physical space as possible.

BRIEF SUMMARY OF THE INVENTION

Apparatus, systems, and methods of managing low grade waste heat energy are provided which alternately produce and consume electric power such that the net power consumption, averaged over time, may produce a net positive power output, produce a "net zero" power output, or consume as little additional power as is absolutely necessary to sustain its own operation, at all times performing the required rejection of low-grade heat. This is accomplished by providing a single apparatus and system that is capable of operation in two modes: 1) an expansion, or ORC, mode that removes and converts low grade waste heat energy into electric power when feasible, and 2) a compression, or refrigeration, mode that consumes electric power to remove low grade waste heat energy when the generation of electric power is not feasible.

The low grade waste heat management system described herein provides a flexible and adaptable waste heat management system that conforms to a wide range of operating and environmental conditions.

In some embodiments, the low grade waste heat management system may produce a net electric power output over time that is greater than zero; that is, more electric power will be generated over time than is consumed. In some embodiments, the low grade waste heat management system may produce a net electric power output over time that is less than zero, meaning the more electric power will have been consumed than generated. In some embodiments, the low grade waste heat management system will produce and consume approximately equal amounts of electric power over time.

The low grade waste heat management system is particularly well-suited for use in support of water-cooled computer data centers but may be utilized in conjunction with any facility or process which generates an abundance of low grade waste heat under operating conditions which vary over time.

The low grade waste heat management system provides a distinct advantage over the prior art in that it provides heat removal by operating in distinct modes under a range of conditions previously unsuitable for any single low grade waste heat management system. When the ambient temperature or other cooling resources are of sufficiently low temperature, the low grade waste heat management system converts waste heat energy into mechanical and/or electric power via the ORC process. When the ambient temperature or other cooling resources are too warm to permit ORC operation, the system is driven by the application of electric power to function as an improved refrigeration cycle process and continue to remove waste heat from the input source.

By virtue of its configuration and design, the low grade waste heat management system provides superior cooling capacity than conventional refrigeration systems. The recapture of electric power in both modes plus the removal of energy from the working fluid flow provides improved efficiency and performance.

The use of a single system which simultaneously provides waste heat removal and useful electric power in the ORC mode, coupled with its ability to provide effective refrigeration and reduced electric power output in the refrigeration mode, represents a substantial improvement over the prior art in low-grade waste heat management systems.

The foregoing is a brief summary of only some of the novel features, problem solutions, and advantages variously provided by the various embodiments. It is to be understood that the scope of an issued claim is to be determined by the claim as issued and not by whether the claim addresses an issue noted in the Background or provide a feature, solution, or advantage set forth in this Brief Summary. Further, there are other novel features, solutions, and advantages disclosed in this specification; they will become apparent as this specification proceeds.

DETAILED DESCRIPTION OF THE PREFERRED AND OTHER EMBODIMENTS OF THE INVENTION

Figure 1:
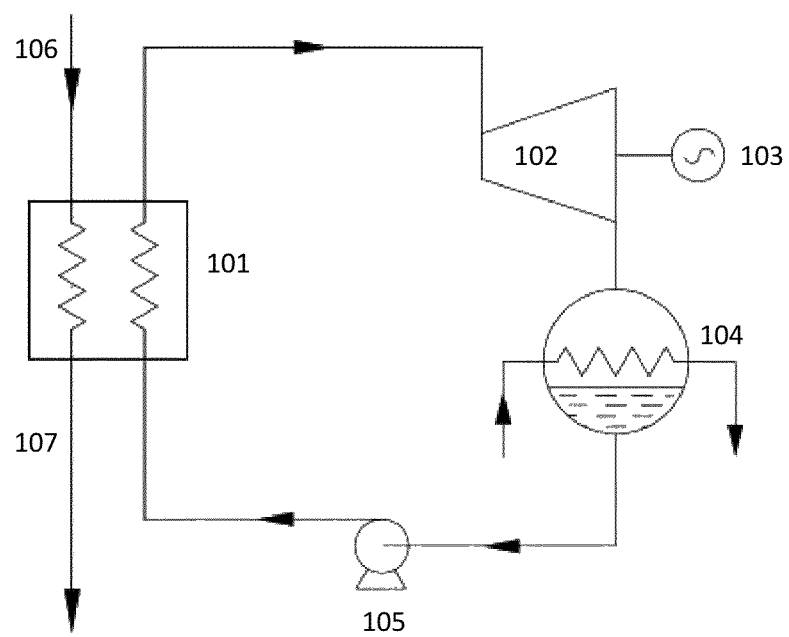
FIG. 1 is a block diagram of a prior art ORC system used to convert waste heat energy into electric power.
Figure 2:
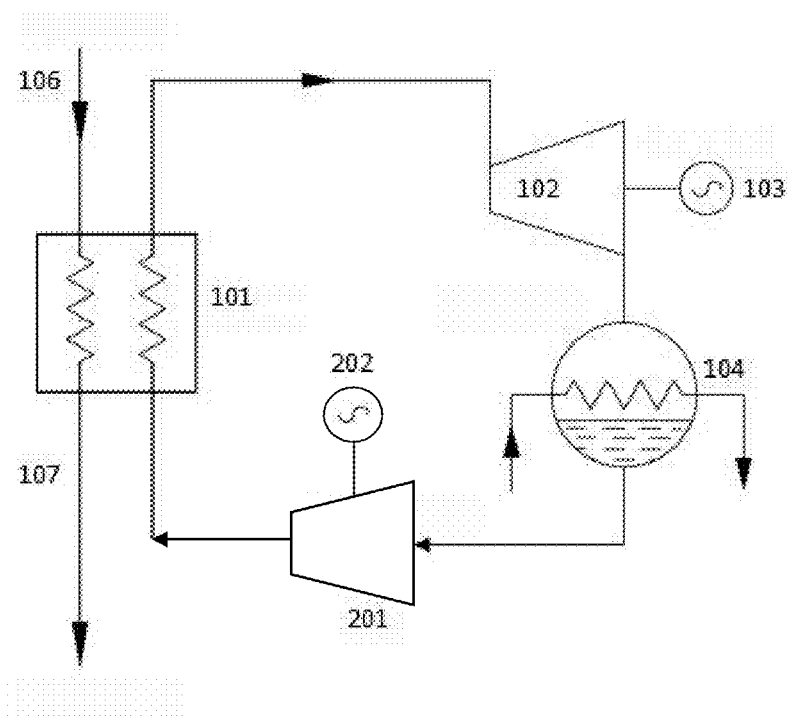
FIG. 2 is a block diagram of one embodiment of a low grade waste heat management system.

The low grade waste heat management system comprises a modified and combined organic Rankine cycle (ORC) system and vapor compression refrigeration system as depicted in FIG. 2. One notable feature not provided in the prior art system of FIG. 1 is positive displacement device 201, which replaces pump 105, and operatively connected electric motor/generator 202. Although referred to as "positive displacement devices" herein, this description is not meant to be limiting. Both positive displacement devices 102 and 201 can be positive displacement devices and/or may be any devices capable of converting pressure into mechanical energy and vice versa, including but not limited to screw-type expanders, other screw pumps, centrifugal pumps, or other machines such as scroll expanders, gerotors, gear pumps, cavity pumps, piston pumps, plunger pumps, and the like.

In one embodiment, the positive displacement devices will be identical machines of the twin screw configuration as taught by Stosic in U.S. Pat. No. 6,296,461. In one embodiment, these positive displacement devices can be of identical characteristics or may be different. In one embodiment, positive displacement devices 102 and 201 may be screw expanders or compressors such as, or similar to, those manufactured by Howden Compressors of Glasgow, Scotland. Specifically, the XRV series of compressors, and in particular the model XRV 127 compressor, is suitable for use as positive displacement device(s) 102 and/or 201 in one embodiment of the invention.

In one embodiment, the low grade waste heat management system utilizes a single closed loop of working fluid typically comprising a mixture of lubrication oil and organic refrigerant suitable for heating and expansion within the range of temperatures provided by the prime mover. By way of example and not limitation, the refrigerant may be R-245fa, commercially known as Genetron® and manufactured by Honeywell. However, any organic refrigerant including but not limited to R123, R134A, R22, R-245ca, and the like as well as any other suitable hydrocarbons or other fluids may be employed in other embodiments.

In one embodiment, a small percentage of lubrication oil by volume is mixed with the refrigerant for lubrication purposes. Any miscible oil suitable for the intended purpose may be used, including but not limited to Emkarate RL 100E refrigerant lubricant, product number 4317-66 manufactured by Nu-Calgon. Lubrication of the bearings in positive displacement devices 102 and 201 may be provided by extracting an appropriate quantity of the cooled mixture of working fluid refrigerant and lubrication oil in liquid state from a suitable point in the system with sufficient pressure from the closed-loop process to provide said mixture directly to the bearings.

In one embodiment, a small percentage of non-soluble immiscible lubrication oil by volume is mixed with the refrigerant for lubrication purposes. Any non-soluble immiscible lubrication oil suitable for the intended purpose may be used, including but not limited to mineral oil. Lubrication of the bearings in positive displacement devices 102 and 201 may be provided by extracting an appropriate quantity of the cooled mixture of working fluid refrigerant and lubrication oil in liquid state from a suitable point in the system with sufficient pressure from the closed-loop process to provide said mixture directly to the bearings.

In one embodiment, an additional lubrication pump is provided to permit extraction of the mixture of liquid working fluid refrigerant and lubrication oil from a point in the system with insufficient pressure to provide said mixture directly to the bearings. This lubrication pump may be powered by electric power generated by the system, mechanical power derived directly from the positive displacement machine(s), or by any other source of electric or mechanical power.

Condenser 104 may be a system of air cooled radiators, water or liquid cooled radiators, or any other system suitable for the purpose. Condenser 104 removes heat from the working fluid by transferring it to one or more suitable cooling resource(s), including, but not limited to, ambient air via radiant or forced air cooling, a natural or man-made source of cooling water, an evaporation device or system, or the like. The cooling resource may be in direct thermal communication with condenser 104 or indirectly applied to condenser 104 via an intermediate medium, such as water, glycol, oil, or the like in thermal transfer communication with both the cooling resource and condenser 104 so as to transfer heat from the working fluid to the cooling resource via said intermediate medium. In order to successfully generate electric power from waste heat input energy, the operating temperature of the cooling resources in thermal transfer communication with condenser 104 must be at least 50° F., and preferably from 80° F.-100° F., less than the temperature of the input waste heat stream. Further, the temperature of the cooling resource available to the condenser system must be from 20° F.-30° F. cooler than the post-expansion working fluid at the condenser input. With low grade waste heat applied at port 106, the temperature of the post-expansion working fluid will generally be lower than with a higher temperature waste heat input and will therefore require cooling resources operating at a lower temperature as well.

In one embodiment, working fluid condensation for the low grade waste heat management system will be provided by air-cooled radiators. In one embodiment, the condensation will be provided by water-cooled radiators or any other suitable apparatus. In either embodiment, the ambient temperature and operating conditions at the site will play a large role in determining the maximum useful temperature of the cooling resources. Further, these factors will vary on an hourly, daily, and seasonal basis.

The low grade waste heat management system may operate in distinct modes. When the cooling resource is of sufficiently low temperature, positive displacement device 102 functions in the conventional ORC expander mode as described above with respect to the prior art. During ORC operation, the pressure in evaporator 101 and at the input to positive displacement device 102 is the highest in the system while the pressure in condenser 104 is significantly lower. The system is pressurized by positive displacement device 201 as driven by motor/generator 202. When the cooling capacity of condenser 104 is no longer sufficient to provide the requisite condensation of post-expansion working fluid, the system will cease to function in the ORC mode and the rotational mechanical energy provided by positive displacement device 102 to grid-connected electric motor/generator 103 will cease as the pressure across positive displacement device 102 approaches zero. At that point, the positive pressure differential between evaporator 101 and condenser 104 will be minimal and may even be zero.

In a second mode of operation (the refrigeration mode), positive displacement device 102 is driven by electric motor/generator 103, which now operates as an electric motor provided that its stator coils are operatively connected to the commercial power grid or other source of electric power. Positive displacement device 102 now functions as a driven compressor as the pressure in condenser 104 increases while the pressure in the evaporator 101 decreases.

Positive displacement device 201 plays a key role in the system. In the ORC mode, it is driven by motor/generator 202 to provide positive pressure to the working fluid through the evaporator and into the inlet port of positive displacement device 102. During the refrigeration mode, positive displacement device 201 replaces the functionality of the expansion, or throttle, valve in a standard refrigeration cycle by providing necessary back pressure against the higher pressure in condenser 104 with respect to evaporator 101. In providing this counter pressure, the working fluid performs work on positive displacement device 201 which may be extracted from the system via motor/generator 202 operating as a generator.

In short, the refrigeration mode of operation may be viewed in some respects as a reverse-cycle equivalent of the ORC mode. Positive displacement device 102 no longer drives a generator but functions as a compressor driven by motor/generator 103 now functioning as an electric motor. Positive displacement device 201, which is driven as a pump by motor 202 in the ORC mode, now extracts energy from the working fluid flow which can be converted to electric power via motor/generator 202 operating in the generator mode. In stark contrast to the ORC mode where pressure in evaporator 101 is considerably higher than that in condenser 104, during operation of the refrigeration mode, the pressure in condenser 104 is the highest in the system while the pressure in evaporator 101 is significantly lower. However, where the ORC cycle removed waste heat energy from the source of low grade waste heat in evaporator 101 via the flow of high pressure heated working fluid, the refrigeration cycle now provides lower temperature working fluid at lower pressure to the input to evaporator 101 which provides cooling comparable to the heat removal function during operation in the ORC mode.

Preferably, the functionality of positive displacement devices 102 and 201 are provided during both modes of operation described herein by single devices at each location. That is, a single positive displacement device 102 provides expansion during ORC operation and compression during refrigeration and a single positive displacement device 201 provides compression during ORC operation and expansion during refrigeration. In one embodiment, different positive displacement devices may be switchably installed in the system to permit the use of different devices at either or both locations. For example, it may be advantageous to utilize an alternate positive displacement device 102 (not shown) better suited to compression during ORC operation than is the positive displacement device 102 best suited for use as an expander during ORC operation. A similar alternate positive displacement device 201 (not shown) may provide superior performance as an expander during refrigeration operation than is possible from the positive displacement device optimized for use during ORC operation. In either case, the alternate positive displacement device(s) may be installed proximate to each other with suitable valves, manifolds, and associated control circuitry used to operatively connect the preferred positive displacement device to the single closed-loop system for each mode.

In one embodiment, the direction of working fluid flow through either or both positive displacement device(s) is the same during both ORC and refrigeration modes of operation. In one embodiment, the direction of working fluid flow through either or both positive displacement device(s) may be reversed from the ORC to refrigeration modes of operation without altering the direction of working fluid flow in the remainder of the system. As one non-limiting example, it may be found that performance from a single positive displacement device is improved by passing the working fluid through the positive displacement device in the opposite direction. This may be accomplished by interchanging the working fluid connections to the input and output ports of the device. Particularly with rotary devices such as, but not limited to, twin screw expanders, an accompanying reversal in the direction of rotation must be provided as the directional flow of working fluid through such device is dependent on the direction of rotation. When coupled to an electric motor/generator, the direction of rotation of said device must be conformed using appropriate means such as reversing two of the three phases of the electrical connection to said motor/generator.

In one embodiment, the motor/generators are asynchronous (induction) machines. In one embodiment, the motor/generators are synchronous machines. In one embodiment, the motor/generators may be any combination of asynchronous or synchronous machines. In one embodiment, the performance of either or both positive displacement device(s), and therefore the overall system, may be controlled by varying the rotational speed of either or both positive displacement device(s). In one embodiment, either or both positive displacement device(s) may be operated under the control of a variable frequency drive system, permitting fine adjustment of the volumetric flow through and the pressure differential across the device. In one embodiment, an inverter-based frequency conversion system may be used in conjunction with a positive displacement device to convert alternating current electric power generated at non-standard frequencies to the desired AC line frequency (50 Hz or 60 Hz, depending on location) for use with available devices and possible coupling to the distribution grid.

In one embodiment, the performance of either or both positive displacement device(s), and therefore the overall system, may be controlled by varying the volume index (Vi). Such adjustments may be used to accommodate varying thermal inputs and the quality of cooling resources available to the system for condensation of the working fluid. Such adjustments to the Vi of a positive displacement device may be accomplished in some devices, including twin screw expanders, via the use of a sliding valve that variably occludes the entrance to the device. Comparable methods of adjusting the Vi of a positive displacement device by providing variable impingement of the volumetric ratio are available for other device configurations. Adjustments to the Vi of a positive displacement device may be made manually or automatically by a system controller/monitor in response to any changes in the waste heat input or condenser cooling resources.

The mode of operation of the system is principally determined by the thermal energy of the waste heat stream and the availability or lack of adequate cooling resources. Such resources are often subject to local environmental conditions, particularly ambient temperature which varies on a diurnal and annual basis. It is common practice to utilize air-cooled radiators in condensing systems and the ability of these systems to provide the necessary cooling are strictly limited by the environment in which they operate. In some embodiments, heat exchangers of the types suitable for use as evaporators and condensers in the system are limited to heating or cooling, respectively, the flow of working fluid to a temperature within approximately 20° F.-30° F. of the stream of waste heat or the cooling resource, respectively, applied to the evaporator or condenser inputs, respectively.

In one embodiment, an input source of waste heat at approximately 170° may be utilized under ambient temperature conditions of 55°. In this embodiment, the working fluid is heated in evaporator 101 by the waste heat stream from an input temperature of 86° F. to an output temperature of 150° at a pressure of approximately 78 psi. The partially vaporized working fluid at this temperature and pressure are applied to positive displacement device 102 acting as an expander, which produces approximately 40 kW of mechanical power upon expansion of the working fluid. Such mechanical power may be applied for any useful purpose, including additional cooling, pumping, or compression functions elsewhere within the system or external to the system, or it may be used to generate approximately 34 kWe of net electric power when exclusively used to drive motor/generator 103. At approximately 107° F. and 28 psi, the expanded working fluid is cooled back to its fully liquid state at approximately 86° F. and 27 psi, whereupon a system pump is applied to the closed-loop working fluid circuit to increase the working fluid pressure to approximately 84 psi before the cooled, pressurized liquid working fluid is once again applied to the evaporator input.

Assume that positive displacement device 102 is coupled to electric motor/generator 103. After supplying all of the system-related parasitic electric loads, including the evaporator and condenser pumps and fans, the system in this embodiment will produce a net electric power output of approximately 25 kWe while also providing cooling by removing heat energy from the low grade waste heat stream. Said electric power may be applied for any other useful purpose, including additional cooling, pumping, or compression functions elsewhere in the system.

In this ORC mode of operation, it will be seen that the system pressure at both the input and output of the evaporator is considerably higher than the corresponding pressures on the condenser side of the system.

In one embodiment, operation of the dual-mode system in its refrigeration mode produces dramatically different operating constants. Here, an input waste heat stream at the same temperature (170° F.) is utilized at the substantially higher ambient temperature of 110° F. Working fluid passing through the evaporator becomes partially vaporized as it attains a temperature of approximately 136° F. at an approximate pressure of 63 psi, whereupon it passes through positive displacement device 102 now functioning as a compressor. The process of compression increases the temperature and pressure of the working fluid to approximately 160° F. and 92 psi, respectively, as it is supplied to the condensing system. During this phase of the cycle, the working fluid is converted from a highly vaporized state to a liquid state by the removal of enthalpy with only minimal losses in temperature and pressure. At the input of positive displacement device 201, which is now functioning as an expander, liquefied working fluid at approximately 157° and 90 psi is expanded to produce mechanical energy that may be used to drive connected electric motor/generator 202 to produce approximately 175 We of electric power or applied for any other useful purpose within the system or external to the system, including but not limited to additional cooling, pumping, or compression functions.

Assuming that positive displacement device 201 is coupled to electric generator 202 and after supplying all of the system-related parasitic electric loads, including the evaporator and condenser pumps and fans, the system in this embodiment will consume net electric power of approximately 28.8 kWe while providing cooling by removing heat energy from the low grade waste heat stream.

In the refrigeration mode, it will be seen that the high and low pressure sides of the system have been reversed when compared to those present in the ORC mode. While the highest system pressure was present in the evaporator during ORC operation, the higher pressure now exists in the system condenser during operation in the refrigeration mode. It therefore follows directly that the lower relative pressure in the ORC condenser is replaced by higher condenser pressure that is greater than that present in the evaporator during refrigeration mode.

Figure 3:
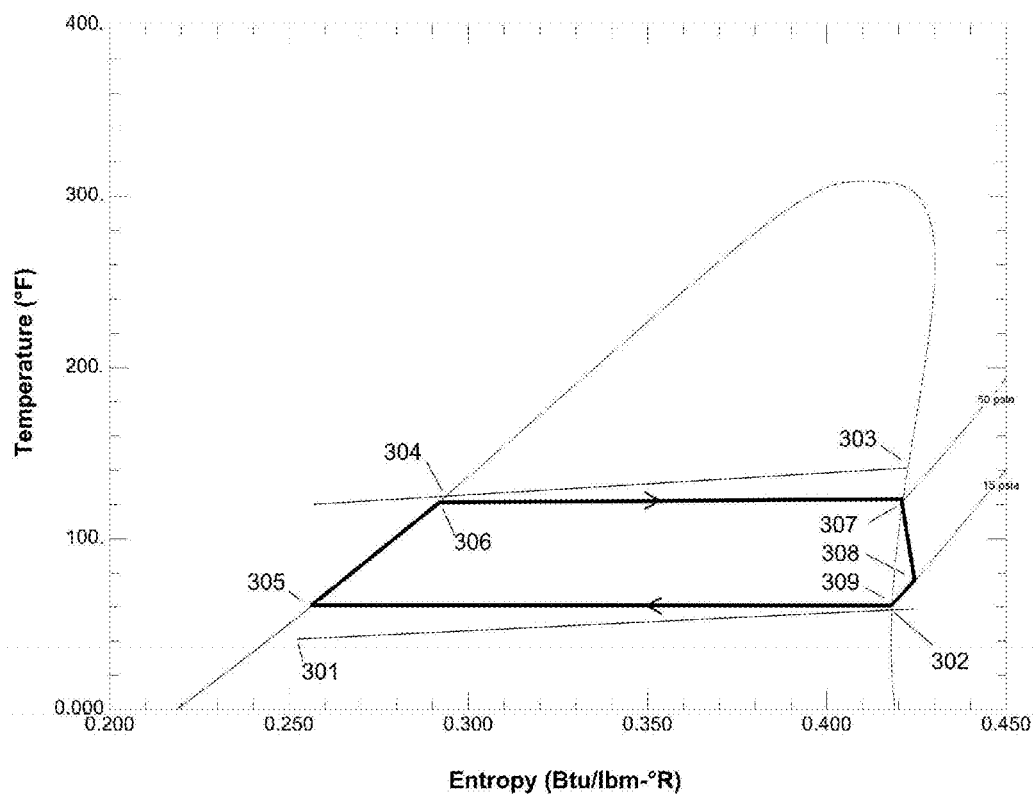
FIG. 3 is a plot of the temperature—entropy relationship in one embodiment of a low grade waste heat management system utilizing R-245fa refrigerant as the working fluid and operating in ORC mode.

FIG. 3 describes one example of a non-limiting embodiment of the dual-mode system operating in ORC mode via the relationship between the entropy and temperature of R-245fa working fluid at various points throughout the system. In this mode, the waste heat temperature and available cooling resources are compatible with the production of mechanical power resulting in a net power output from the system derived from waste heat. A source of cooling water at 40° F. is provided (301) to condenser 104 in counterflow to the direction of the working fluid flow. In this manner, the lowest temperature cooling water entering the condenser is in thermal transfer communication with the lowest temperature working fluid as it leaves the condenser. Similarly, the cooling water is heated by heat transfer from working fluid in condenser 104 and exits at approximately 57° F. (302), where it is in thermal transfer communication with the highest temperature working fluid at the working fluid input to condenser 104. Low grade waste heat at 140° F. (303), directly or via an intermediate heat transfer medium, is also applied in counterflow to the direction of the working fluid flow in evaporator 101 so that the highest temperature waste heat is in thermal transfer communication with the highest temperature working fluid exiting evaporator 101. The waste heat source exits evaporator 101 at approximately 120° F. (304) in thermal transfer communication with the lowest temperature working fluid entering evaporator 101.

At 305, working fluid enters evaporator 101 at approximately 60° F. and is first heated to the vaporization temperature (306) of the particular working fluid by the counterflowing waste heat. The working fluid continues to absorb energy from the waste heat source as its entropy increases. At 307, the heated working fluid is provided to positive displacement device 102 where mechanical energy is recovered via expansion of the working fluid as pressure decreases from approximately 50 psi (307) to 15 psi (308). This mechanical energy may be used, in whole, in part, or in combination, to drive electric generator 103, provide mechanical energy to the source of waste heat, drive other devices associated or not associated with the system including but not limited to fans, compressors, and the like, or for any other useful purpose. In condenser 104, the expanded working fluid is cooled (308 to 305), where positive displacement device 201, acting as a pump driven by an electric motor/generator and associated control apparatus (not shown) at 305, provides motive force to return the cooled working fluid to evaporator 101 to repeat the cycle.

Figure 4:
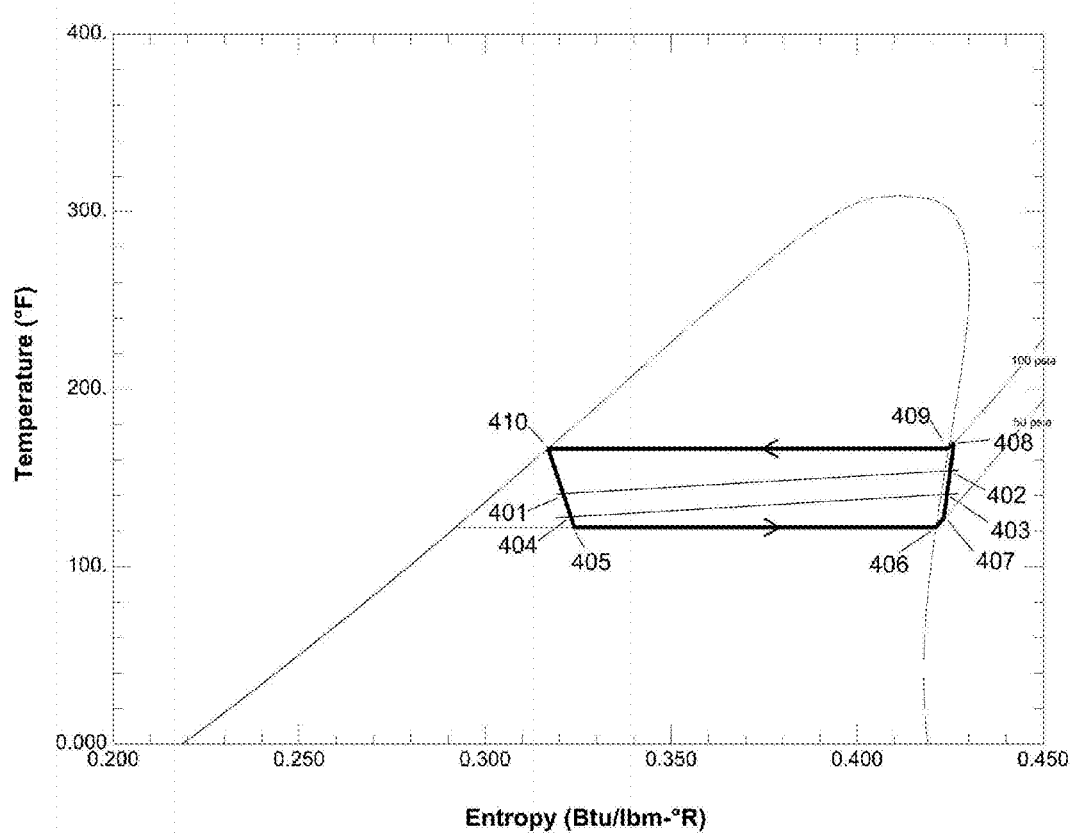
FIG. 4 is a plot of the temperature—entropy relationship of one embodiment of a low grade waste heat management system utilizing R-245fa refrigerant as the working fluid and operating in refrigeration mode.

One example of a non-limiting embodiment of the low grade waste heat management system operating in the refrigeration mode of operation is depicted in FIG. 4. Given the temperature of the low grade waste heat and cooling resources available to the system, operation in ORC mode is no longer feasible due to the high ambient temperature with respect to the available waste heat temperature and, therefore, the lack of adequate cooling for this mode. Here, cooling water at 140° F. (401) is applied in counterflow to the input of condenser (104) and exits at approximately 160° F. (402). Low grade waste heat at 140° F. (403), directly or via an intermediate heat transfer media, is also applied in counterflow to the direction of the working fluid flow in evaporator 101 and exits at approximately 130° F. (404).

At 405, working fluid enters evaporator 101 at approximately 122° F. and its entropy is increased by the counterflowing waste heat source (to 406). In some embodiments, the temperature during the evaporation transfer rises slightly above the vaporization temperature of the particular working fluid (at 407). This transfer of heat causes the entropy of the largely, or entirely, vaporized working fluid to increase. At 407, the heated working fluid is provided to positive displacement device 102, now functioning as a compressor driven by motor/generator 103. This compression performs work on the working fluid by increasing pressure from approximately 50 psia (407) to approximately 100 psia (408), thereby causing the temperature of the vaporized working fluid to reach its highest entropy in the system (408). In condenser 104, the enthalpy of the vaporized working fluid is reduced from 409 to 410 as the working fluid is liquefied at an essentially constant pressure. At 410, the high pressure working fluid is supplied to positive displacement device 201 where enthalpy in the pressurized liquid working fluid is extracted via expansion to provide mechanical energy at positive displacement device 201 that may also be used, in whole, in part, or in combination, to drive electric motor/generator 202, provide mechanical energy to the source of waste heat, drive other devices associated or not associated with the system including but not limited to fans, compressors, refrigeration equipment, and the like, or for any other useful purpose.

A novel feature of this system is that during operation in the refrigeration mode, the temperature of the condenser and associated cooling resource available to the system may be equal to or, in some embodiments, greater than that of the input low grade waste heat stream due to the increase in enthalpy produced by positive displacement device 102 functioning as a compressor. This capability is clearly not possible during operation in ORC mode where the temperature of the condenser's cooling resource must be at least 50° F., and preferably from 80° F.-100° F., cooler than that of the input waste heat stream. In this manner, the system is capable of providing both heat consumption and power generation associated with ORC systems while also providing active refrigeration for comparable use in cooling a low-grade waste heat stream under operating conditions completely incompatible for use with power-generating ORC-compatible systems known in the art.

In this manner, the essential components of a single system may be used in two modes with vastly different operating parameters that serve the same principal function of rejecting low-grade heat. Under certain operating conditions, the ORC mode of the system consumes energy from one or more low grade waste heat sources and provides electric and/or mechanical power for any beneficent purpose. When insufficient cooling resources are available for operation in ORC mode, the system functions in refrigeration mode, similarly consuming heat from one or more sources of low grade waste heat, consuming net electric power necessary to drive positive displacement device 102 via motor/generator 103, while generating a small measure of offsetting electric and/or mechanical power for any beneficent purpose.

It is a principal advantage of the low grade waste heat management system that both a modified organic Rankine cycle system and a modified vapor compression refrigeration cycle system may be provided using a single closed loop working fluid system comprising a common evaporator system, a common condenser system, and common positive displacement machines that alternately function as compressors (to provide positive pressure and motive force to the working fluid) and expanders (to convert a portion of the latent energy in the working fluid stream into mechanical and/or electric power).

In the refrigeration mode of operation, the low grade waste heat management system provides significant additional advantages over conventional refrigeration systems. By removing energy from the flow of working fluid via positive displacement device 201 and converting it to electric power, the cooling capacity of the overall system is increased. The reduction in mechanical energy of the working fluid stream translates into a lower temperature in the evaporator, increasing cooling capacity and the overall efficiency of the system when calculated with respect to the driving power applied to positive displacement device 102 by motor/generator 103. Unlike standard refrigeration cycles that typically do not recover the energy removed by an expansion valve, the low grade waste heat management system recovers useful electric power while enhancing its ability to reduce latent low grade waste heat.

As described above, the system produces a net electric power output during operation in the ORC mode and consumes net electric power in the refrigeration mode. The duty cycle of each mode is dependent on the environmental and operating requirements of each particular installation, and a myriad of factors are critical to the design of a system that will perform optimally. Such factors include the time-dependent availability, temperature, heat capacity, and volumetric flow of the input waste heat stream, the availability of a suitable cooling resource for the condenser and any time-dependent variation in the temperature and other quality of said cooling resource, and the availability of electric power sufficient to drive the system in the net power-consuming refrigeration mode, among other factors.

Figure 5:
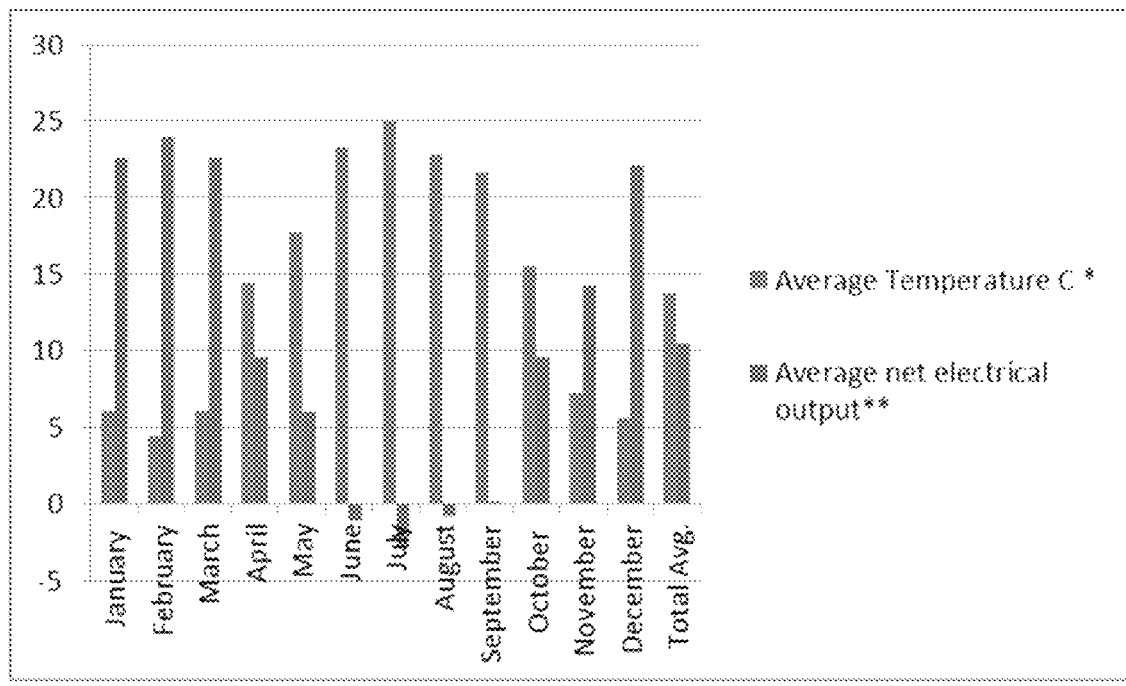
FIG. 5 is a graphical depiction of the average net power output and consumption of one embodiment of a low grade waste heat management system with an input waste heat stream at 170° F.

FIG. 5 presents an overview of one exemplary embodiment the expected duty cycles of the power generation and power consumption modes for a low grade waste heat management system corresponding to one embodiment of the invention (a low grade waste heat input stream of approximately 170° F. operating in a particular location with an average annual ambient temperature of approximately 55° F.). Average temperature data for this and the following example was obtained from a reputable commercial aggregator of local climatological data provided by NOAA, the U.S. Federal Aviation Administration, and a network of Personal Weather Systems (PWS). The system provides an average net electric power output during nine of the twelve months of the year and is only marginally a net average power consumer during three months. In the cooler winter months with lower average temperatures, the monthly average net electrical power output from the system is the greatest due to the fact that the system operates predominantly, or even exclusively, in ORC power generation mode due to the availability of suitable cooling resources for the condenser. During the warmer months of June, July, and August, the average monthly net electrical power output is negative, denoting that the system consumed more electric power than it generated during those months. However, it is clearly shown that the greatest net power consumption occurred in the month of July and is only approximately 2.5 kWe, far less than the maximum average net power output of approximately 24 kWe during the month of February. This is due to the fact that operation in the power-consumption mode would only be necessary during the warmest portions of the day, while power-generating ORC operation was feasible during cooler periods at night and early mornings (diurnal temperature variations are not depicted). It is apparent that given the local environmental conditions and temperature of the input waste heat stream of this example, the system will produce far more power on an annual basis than it will consume (an annual average net electric power output slightly in excess of 10 kWe, as shown).

Figure 6:
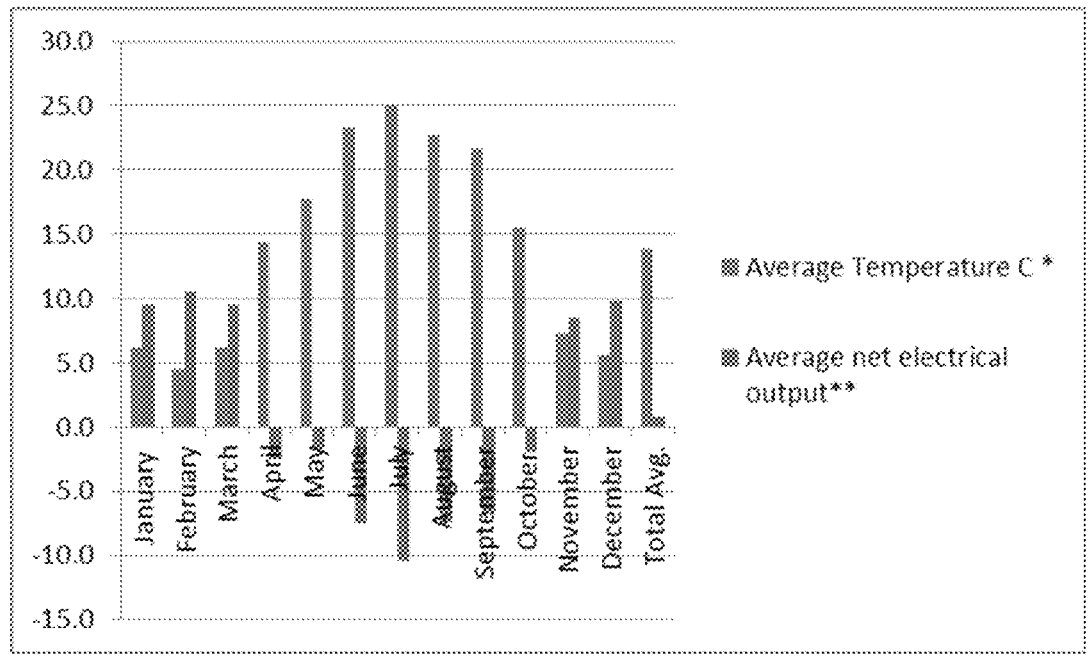
FIG. 6 is a graphical depiction of the average net power output and consumption of one embodiment of a low grade waste heat management system with an input waste heat stream at 150° F.

In contrast, FIG. 6 describes the duty cycle of power generation to power consumption modes at the identical location but with the temperature of the available low grade waste heat stream reduced from approximately 170° F. to approximately 150°. Low grade waste heat at this reduced temperature is more consistent with that produced by automotive manufacturing, food processing, and similar applications. It can be seen that the maximum average net monthly electric power output is slightly greater than 10 kWe, down from 24 kWe in the previous example. That fact reveals that even during the coldest months of the year, the system would run in the refrigeration mode for a considerable portion of the month so as to reduce the average net electric output for that month by 58%. Further, the number of months during which the system produces a net positive average electric power output is now equal to the number of months during which average net electric power is consumed (six). It is also revealed that the greatest monthly average net power consumption of approximately 10 kWe during July is identical to the greatest average net monthly electric power output in February. Finally, the annual average net electric power output of this system is only marginally greater than zero (approximately 0.5 kW, as shown). In this case, the nearly equal effective duty cycles of each mode clearly result in a system that essentially produces a "net zero" electric power output while providing effective low grade waste heat management in both modes of operation. A traditional ORC system at this location would only be a feasible cooling solution for approximately half of the coldest months and far less than that during the warmer months.

Clearly, the reduction in temperature of the input waste heat stream from a moderate temperature of 170° F. to 150° F. creates an entirely new set of operating requirements, demonstrating a need for a system capable of both generating power while consuming waste heat energy when possible and providing active cooling when operating conditions are hostile to conventional ORC methods, in both cases rejecting the required amount of heat.

The description of this invention is intended to be enabling and not limiting. It will be evident to those skilled in the art that numerous combinations of the embodiments described above may be implemented together as well as separately, and all such combinations constitute embodiments effectively described herein.

We claim:

1. A system for managing low grade waste heat, the system comprising:

A. a source of low grade heat, more than one electric motor/generators comprising at least a first electric motor/generator and a second electric motor/generator, and an organic working fluid comprising a liquid state and a vaporized state;

B. an evaporator in thermal transfer communication with the source of low grade heat and in further thermal transfer communication with the working fluid;

C. a first positive displacement machine comprising (i) a working fluid input in working fluid receiving communication with the evaporator and (ii) a working fluid output, said first positive displacement machine in exclusive mechanical power transfer communication with the first electric motor/generator;

D. a condenser in working fluid receiving communication with the working fluid output of the first positive displacement machine;

E. a second positive displacement machine comprising (i) a working fluid input in working fluid receiving communication with the condenser and (ii) a working fluid output in working fluid sending communication with the evaporator, said second positive displacement machine in exclusive mechanical power transfer communication with the second electric motor/generator;

wherein the system is configured to:

i) expand the organic working fluid in either the first or second positive displacement machine, thereby generating electric power output, when a positive pressure differential exists between the working fluid input and the working fluid output of that positive displacement machine; and ii) compress the organic working fluid in either the first or second positive displacement machine, thereby consuming electric power by the first or second motor/generator, respectively, when the pressure differential between the working fluid input and the working fluid output of that positive displacement machine is zero or negative;

such that whenever the first motor/generator or second motor/generator is generating electric power output, the second motor/generator or first motor/generator, respectively, is consuming electric power.

2. The system of claim 1 configured to operate in an ORC mode whenever the first electric motor/generator generates electric power output and the second electric motor/generator consumes electric power.

3. The system of claim 1 configured to operate in a refrigeration mode whenever the second electric motor/generator generates electric power output and the first electric motor/generator consumes electric power.

4. The system of claim 1 wherein the first electric motor/generator, the second electric motor/generator, or the first electric motor/generator and the second electric motor/generator is in electric power output transfer communication with the system.

5. The system of claim 1 wherein the first electric motor/generator, the second electric motor/generator, or the first electric motor/generator and the second electric motor/generator is not in electric power output transfer communication with the system.

6. The system of claim 1 wherein the first positive displacement device, the second positive displacement device, or the first positive displacement device and the second positive displacement device are configured to permit manual, automatic, or manual and automatic adjustment of their volume index (Vi).

7. The system of claim 1 wherein the first positive displacement device, the second positive displacement device, or the first positive displacement device and the second positive displacement device are configured to permit manual, automatic, or manual and automatic adjustment of their speed.

8. The system of claim 1 wherein the average net electric power output of the system averaged over time is greater than zero.

9. The system of claim 1 wherein the average net electric power output of the system averaged over time is zero.

10. The system of claim 1 wherein the average net electric power consumption of the system averaged over time is greater than zero.

11. The system of claim 1 wherein the source of low grade heat is derived from automotive manufacturing, food processing, oil and natural gas processing, or a computer data center.

12. The system of claim 1 wherein the evaporator, the first positive displacement machine, the condenser, and the second positive displacement machine comprise a closed-loop organic working fluid circuit.

13. A system for managing low grade waste heat, the system comprising:

A) a source of low grade heat, more than one electric motor/generators comprising at least a first electric motor/generator and a second electric motor/generator, and an organic working fluid comprising a liquid state and a vaporized state;

B) a first expander/compressor configured to convert working fluid pressure into mechanical power and mechanical power into working fluid pressure, said first expander/compressor (i) comprising a working fluid input and a working fluid output, and (ii) in mechanical power transfer communication with the first electric motor/generator;

C) an evaporator (i) in heat energy transfer communication with a source of low grade heat, (ii) in heat energy transfer communication with the working fluid, and (iii) in working fluid sending communication with the working fluid input of the first expander/compressor;

D) a condenser (i) in heat energy transfer communication with the working fluid and (ii) in working fluid receiving communication with the working fluid output of the first expander/compressor;

E) a second expander/compressor configured to convert working fluid pressure into mechanical power and mechanical power into working fluid pressure, said second expander/compressor (i) comprising a working fluid input in working fluid receiving communication with the condenser, (ii) further comprising a working fluid output in working fluid sending communication with the evaporator, and (iii) in mechanical power transfer communication with the second electric motor/generator;

wherein the system is configured to:

a) generate mechanical power expanding working fluid in the first expander/compressor and consume electric power with the second electric motor/generator to pressurize working fluid in the second expander/compressor when the pressure at the working fluid input of the first expander/compressor is greater than the pressure at the working fluid input of the second expander/compressor; and b) generate mechanical power by expanding working fluid in the second expander/compressor and consume electric power with the first electric motor/generator to pressurize working fluid in the first expander/compressor when the pressure at the working fluid input of the second expander/compressor is greater than the pressure at the working fluid input of the first expander/compressor, such that the first expander/compressor and the second expander/compressor are not in mechanical power transfer communication with the second electric motor/generator and the first electric motor/generator, respectively, or with each other.

14. The system of claim 13 wherein the first expander/compressor, the condenser, the second expander/compressor, and the evaporator comprise a closed-loop organic working fluid circuit.

15. The system of claim 13 further comprising at least one of any of a fan, a pump, a compressor, or refrigeration equipment wherein the first expander/compressor, the second expander/compressor, or the first expander/compressor and the second expander/compressor are operative to communicate mechanical power to or from at least one of any of said fan, pump, compressor, or refrigeration equipment.

16. The system of claim 13 wherein the first expander/compressor, the second expander/compressor, or the first expander/compressor and the second expander/compressor are configured to permit manual, automatic, or manual and automatic adjustment of their volume index (Vi).

17. The system of claim 13 wherein the first expander/compressor, the second expander/compressor, or the first expander/compressor and the second expander/compressor are configured to permit manual, automatic, or manual and automatic adjustment of their speed.

18. The system of claim 17 wherein the average net electric power output of the system averaged over time is greater than zero.

19. The system of claim 17 wherein the average net electric power output of the system averaged over time is zero.

20. The system of claim 17 wherein the average net electric power consumption of the system averaged over time is greater than zero.

21. The system of claim 17 wherein the first rotating machine and the second rotating machine comprise a closed-loop organic working fluid circuit.

22. A system for managing low grade waste heat, the system comprising:

A. an organic working fluid and more than one electric motor/generators comprising at least a first electric motor/generator and a second electric motor/generator;

B. a first rotating machine comprising a working fluid input and a working fluid output, said machine (i) configured to convert working fluid pressure into mechanical power and mechanical power into working fluid pressure, and (ii) in rotational power communication with the first electric motor/generator;

C. a second rotating machine comprising a working fluid input and a working fluid output, said machine (i) configured to convert working fluid pressure into mechanical power and mechanical power into working fluid pressure, and (ii) in rotational power communication with the second electric motor/generator;

wherein the system is configured to:

a) expand working fluid in the first rotating machine when the positive pressure differential between the working fluid input and the working fluid output of the first rotating machine is greater than the positive pressure differential between the working fluid input and the working fluid output of the second rotating machine, thereby generating electric power output via the first electric motor/generator, while at the same time compressing working fluid in the second rotating machine by consuming electric power provided to the second electric motor/generator; and b) expand working fluid in the second rotating machine when the positive pressure differential between the working fluid input and the working fluid output of the second rotating machine is greater than the positive pressure differential between the working fluid input and the working fluid output of the first rotating machine, thereby generating electric power output via the second electric motor/generator, while at the same time compressing working fluid in the first rotating machine by consuming electric power provided to the first electric motor/generator.

* * * * *